United States Patent
Tietze et al.

(10) Patent No.: US 6,290,253 B1
(45) Date of Patent: Sep. 18, 2001

(54) RESTRAINING DEVICE WITH TENSIONING ELEMENT

(75) Inventors: Hans-Joachim Tietze, Heubach; Jochen Schaupp, Aalen, both of (DE)

(73) Assignee: TRW Occupant Restraint Systems GmbH & Co. KG, Alfdorf (DE)

(*) Notice: Subject to any disclaimer, the term of this patent is extended or adjusted under 35 U.S.C. 154(b) by 0 days.

(21) Appl. No.: 09/601,690
(22) PCT Filed: Feb. 2, 1999
(86) PCT No.: PCT/EP99/00899
  § 371 Date: Aug. 7, 2000
  § 102(e) Date: Aug. 7, 2000
(87) PCT Pub. No.: WO99/41110
  PCT Pub. Date: Aug. 19, 1999

(30) Foreign Application Priority Data

Feb. 13, 1998 (DE) ............................................. 298 02 507

(51) Int. Cl.[7] ................................................. B60R 21/22
(52) U.S. Cl. ........................................................ 280/730.2
(58) Field of Search ............................ 280/730.1, 730.2, 280/743.1, 733

(56) References Cited

U.S. PATENT DOCUMENTS

| 5,322,322 |   | 6/1994 | Bark et al. |
|-----------|---|--------|-------------|
| 5,765,869 | * | 6/1998 | Huber ................................... 280/807 |
| 5,865,462 | * | 2/1999 | Robins et al. ..................... 280/730.2 |
| 5,941,564 | * | 8/1999 | Acker ................................ 280/743.2 |
| 6,010,149 | * | 1/2000 | Riedel et al. ..................... 280/730.2 |
| 6,099,029 | * | 8/2000 | H.ang.land et al . ................ 280/729 |

FOREIGN PATENT DOCUMENTS

| 19639617 | 4/1998 | (DE) . |
| 2324068  | 10/1998 | (GB) . |
| 2327066  | 1/1999 | (GB) . |

* cited by examiner

*Primary Examiner*—Paul N. Dickson
(74) *Attorney, Agent, or Firm*—Tarolli, Sundheim, Covel, Tummino & Szabo L.L.P.

(57) ABSTRACT

A restraint device for vehicle occupants, in particular for the lateral restraining of the occupant, comprising an inflatable gas bag (10) and a tensioning device which is connected with the vehicle, engages the gas bag, pulls the gas bag into an intended position on inflation, and holds the gas bag in this position, is characterized in that the tensioning device has at least one inflatable tightening means (20) which shortens in the pulling direction by the inflation and thereby exerts a tensile force on the gas bag.

13 Claims, 4 Drawing Sheets

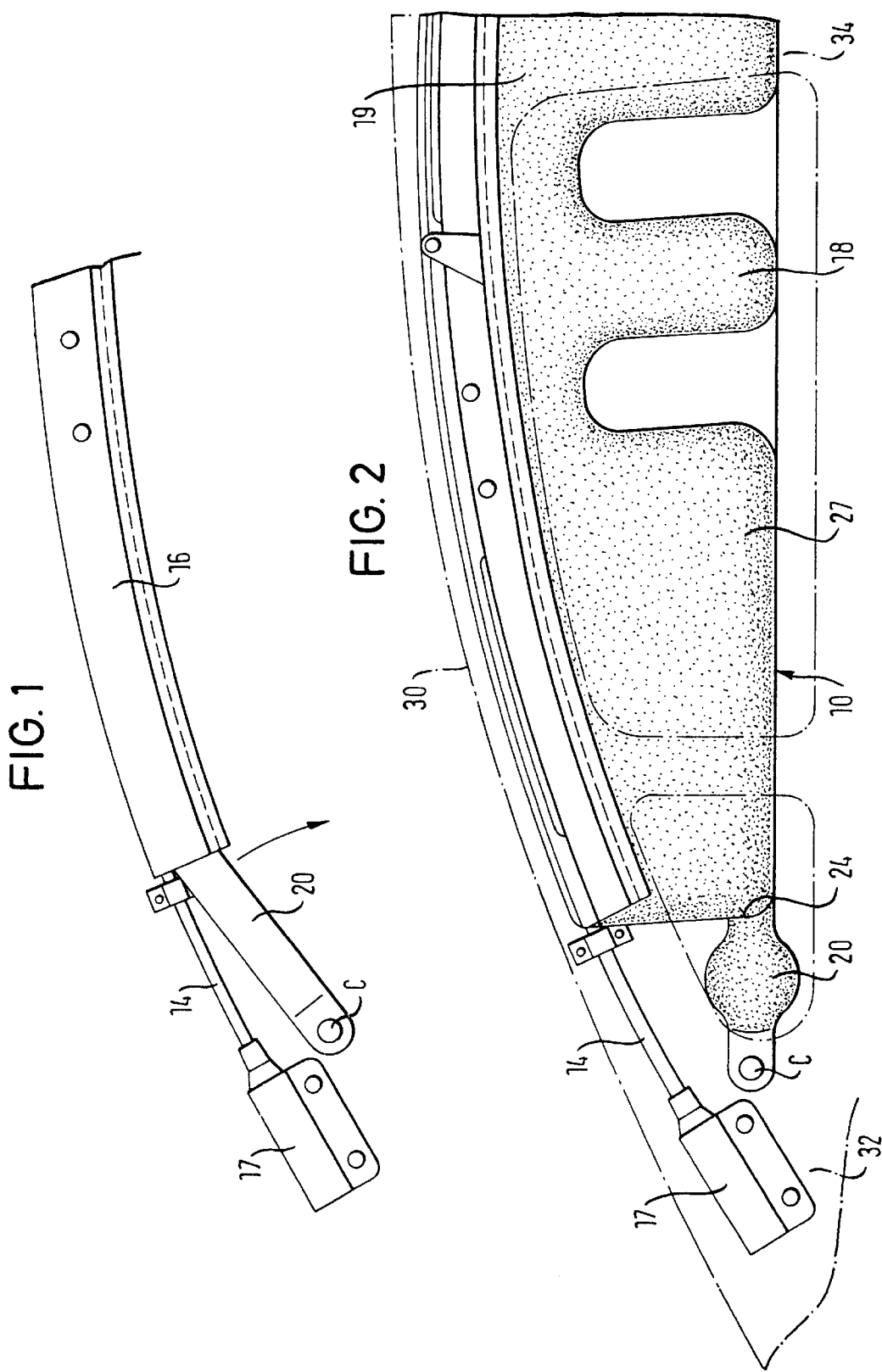

RESTRAINING DEVICE WITH TENSIONING ELEMENT

The present invention relates to a restraint device for vehicle occupants, in particular for the lateral restraining of the occupant, comprising an inflatable gas bag and a tensioning device which is connected with the vehicle, engages the gas bag, pulls the gas bag into an intended position on inflation and holds the gas bag in this position. Such a restraint device is described for example in the DE-U-296 15 485. In the known restraint system or air bag system, a tensioning device with tension spring and tensioning band is used, in order to pull the air bag or inflatable gas bag into an intended position during the inflation process. The tensioning device also serves to hold the inflated gas bag in the position reached and provided in the vehicle, when the vehicle occupant strikes the inflated gas bag with his body, e.g. his head. The tensioning device is technically expensive, however. Without using the tensioning device, it can happen that the gas bag is not stretched between its fastening points. Then, however, it does not offer any sufficient restraining effect when the occupant strikes it.

The invention provides a restraint device with a simple and favorably-priced tensioning device, which makes possible to stretch the gas bag and fix it in position in the inflated state.

The restraint device or air bag device according to the invention, for vehicle occupants and in particular for the lateral restraining of the occupant, comprises an inflatable gas bag and a tensioning device which is connected with the vehicle, engages the gas bag, pulls the gas bag into an intended position on inflation, and holds the gas bag in this position, the tensioning device comprising at least one inflatable tightening means which for example is tube-shaped or bag-shaped, the tightening means shortening itself in the pulling direction through inflation and thereby exerting a tensile force on the gas bag.

On inflation of the tightening means of the restraint device according to the invention, generally a deformation or a bulging of the inflatable tightening means occurs, which produces a longitudinal contraction or shortening of the inflatable tightening means, whereby a tensile force corresponding to the shortening is exerted onto the gas bag on inflation and also in the inflated state of the gas bag, in order to keep it in the intended position. The inflatable tightening means of the invention therefore avoids the disadvantageous expansion- or slack effects of the tensioning band or tensioning cable used in the prior art and therefore has superior tightening characteristics.

Preferably, the inflatable tightening means of the invention is inflated by means of the gas flowing into the gas bag, i.e. a fluid connection or flow opening is formed between the gas bag and the inflatable tightening means. This has the considerable advantage that the inflatable tightening means, which can be tube-shaped or bag-shaped, represents an additional volume to receive gas from the interior of the gas bag, whereby a high internal pressure is avoided and a rebound effect is at least reduced when the vehicle occupant strikes onto the protective gas bag. As an excess pressure in the gas bag is reduced through the flow connection between gas bag and tightening means, a tearing of the gas bag is prevented.

The inflatable tightening means is preferably designed such that with an increasing internal pressure of the gas or of the gas mixture in the tightening means or in the inflatable tensioning band, the tensile force exerted by the tightening means also increases. If, in an emergency, the occupant strikes the inflated, protective gas bag, the displaced bag volume or the resulting excess pressure is at least partially let off into the inflatable tightening means, whereby an increasing internal pressure is produced in the latter. The additional internal pressure, however, means an additional shortening of the tightening means or of the inflatable tensioning band and hence an additional tensile force on the gas bag, from which an additional tensioning of the gas bag results.

The inflatable tightening means of the invention is preferably designed in terms of shape and connection such that it bulges on inflation in a direction perpendicular to the pulling direction, or generally deforms such that it is shortened in the pulling direction.

A tube-shaped or cylindrical tensioning bag is preferred, or an inflatable tensioning band, the pulling direction of which coincides with its longitudinal axis.

The inflatable tightening means also supports the gas bag. Hence the gas bag is also firmly supported when the window panes break, which frequently occurs in a lateral collision. Through the supporting of the gas bag by the inflatable tightening means, therefore, the occupant is prevented from being hurled out.

The tube-shaped or bag-shaped tightening means can be connected at one end with the gas bag and at the other end with a body of the vehicle, i.e. it can serve as the sole tensioning means for the gas bag. However, the tube-shaped tensioning band can also be connected for example at one end with the gas bag and at the other end with a pretensioning arrangement, e.g. a tension spring.

The inflatable tightening means can be used instead of the tensioning band according to DE-U-296 15 485 or in combination with the tensioning band of the prior art. In addition to the tensioning band of the prior art, the tightening means can also be arranged at a different point on the gas bag, e.g. at an attachment point other than in the conventional tensioning band.

The inflatable tightening means can be secured to the gas bag as desired, but is preferably sewn to it or woven thereon.

The restraint device according to the invention can have a gas bag with several chambers, in order to obtain an additional shortening or longitudinal contraction of the gas bag itself, which adds to the shortening of the inflatable tightening means and improves the bracing and tightening of the gas bag.

The tensioning device can have several tightening means, which can be arranged at different points on the gas bag, in order to improve the fixing of the gas bag in position and/or to make available several support points for the gas bag.

Further advantageous further developments of the subject-matter of the invention are indicated in sub-claims 2 to 13.

Further advantages, possibilities of application and advantageous further developments of the invention are to be seen from the following description of embodiments in connection with the drawings, in which:

FIG. 1 shows a cut-out partial view of an embodiment of the restraint device according to the invention, with a folded gas bag and with a tensioning device having an inflatable, band-shaped tightening means;

FIG. 2 shows the partial view of FIG. 1 with activated restraint device, the gas bag and the tightening means being inflated;

Figure 3:
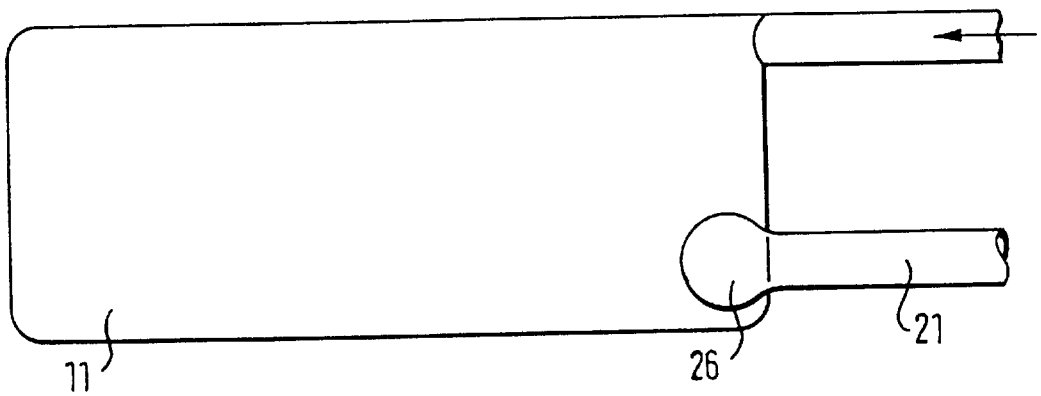
FIG. 3 shows a diagrammatic view which shows an example for the arrangement of an inflatable tightening means on a gas bag.

Hereinbelow, an embodiment of the restraint device according to the invention is explained with the aid of FIGS. 1 and 2. The illustrated restraint device comprises in addition to an electronic control (not shown) a gas bag 10 with several chambers 18, 19, 27 being in flow connection with each other, a gas pipe 14, a gas generator 17 which, after having been activated by the electronic control, emits a gas or a gas mixture into the gas pipe 14, which in turn supplies the gas to the gas bag 10 uniformly over its entire length, in order to inflate it. An inflatable tensioning band is arranged between the gas bag 10 and a C-column 32 of the vehicle as an inflatable tightening means 20 of a tensioning device.

The gas bag 10 is designed as a side impact air bag in the occupant compartment on the driver side and extends from an A-column (not shown) over a B-column 34 up to the C-column 32 of the body of a vehicle indicated in dot-and-dash lines in FIG. 2. The gas bag 10, when it is not required, is folded together in a mounting 16, e.g. behind a covering (not shown) which is able to be folded away. The mounting 16, the gas generator 17 and the gas pipe 14 are secured to a roof strut of the roof frame 30 of the motor vehicle.

The inflatable, tube-like tightening means 20 is rotatably fastened by one end on the C-column 32 about a rotation point C. At this end, the tightening means 20 is closed. The other end of the tightening means 20 is open and at the lower edge of the unfolded gas bag 10 is firmly connected therewith, e.g. is woven on or sewn to the gas bag 10. Between the interior of the gas bag 10 and the interior of the tightening means 20 a fluid connection 24 is provided, e.g. an opening in the gas bag 10, via which gas can flow out from the interior of the gas bag 10 into the interior of the tightening means 20 and vice versa. Between the A-column and the other end of the gas bag 10, not shown, a corresponding tightening means is arranged.

The tightening means 20 consists of the same material as the gas bag 10 or of any desired other air bag material. The material of the tightening means 20 can have an exterior and/or an interior coating. The fabric of the inflatable tightening means 20 has a weaving direction of 45° to the longitudinal extent of the tightening means 20.

If a side impact takes place, the electronic control activates the gas generator 17, which then supplies gas to the gas bag 10 via the gas pipe 14. The gas bag 10 emerges from the mounting 16 and very quickly assumes the inflated state shown in FIG. 2. Simultaneously with the filling of the gas bag 10, the gas flows from the interior of the gas bag 10 also into the interior of the tightening means 20. The internal pressure of the tightening means 20 continues to increase. The increasing internal pressure in the tightening means 20 leads to an ever greater deformation or bulging of the fabric material of the tightening means 20, whereby the tightening means 20 shortens more and more. Through the shortening, the tightening means 20 exerts a tensile force on the gas bag 10 at the fastening point of the tightening means 20 on the gas bag 10. This tensile force acts along a central longitudinal axis of the tube-like tightening means 20 and pulls the gas bag 10 into an intended end position and holds it securely therein. The numerous chambers 18, 19, 27 additionally lead to the gas bag fabric bulging out, which results in a contraction of the gas bag in longitudinal direction of the vehicle. This effect increases the tensile force.

Figure 6:
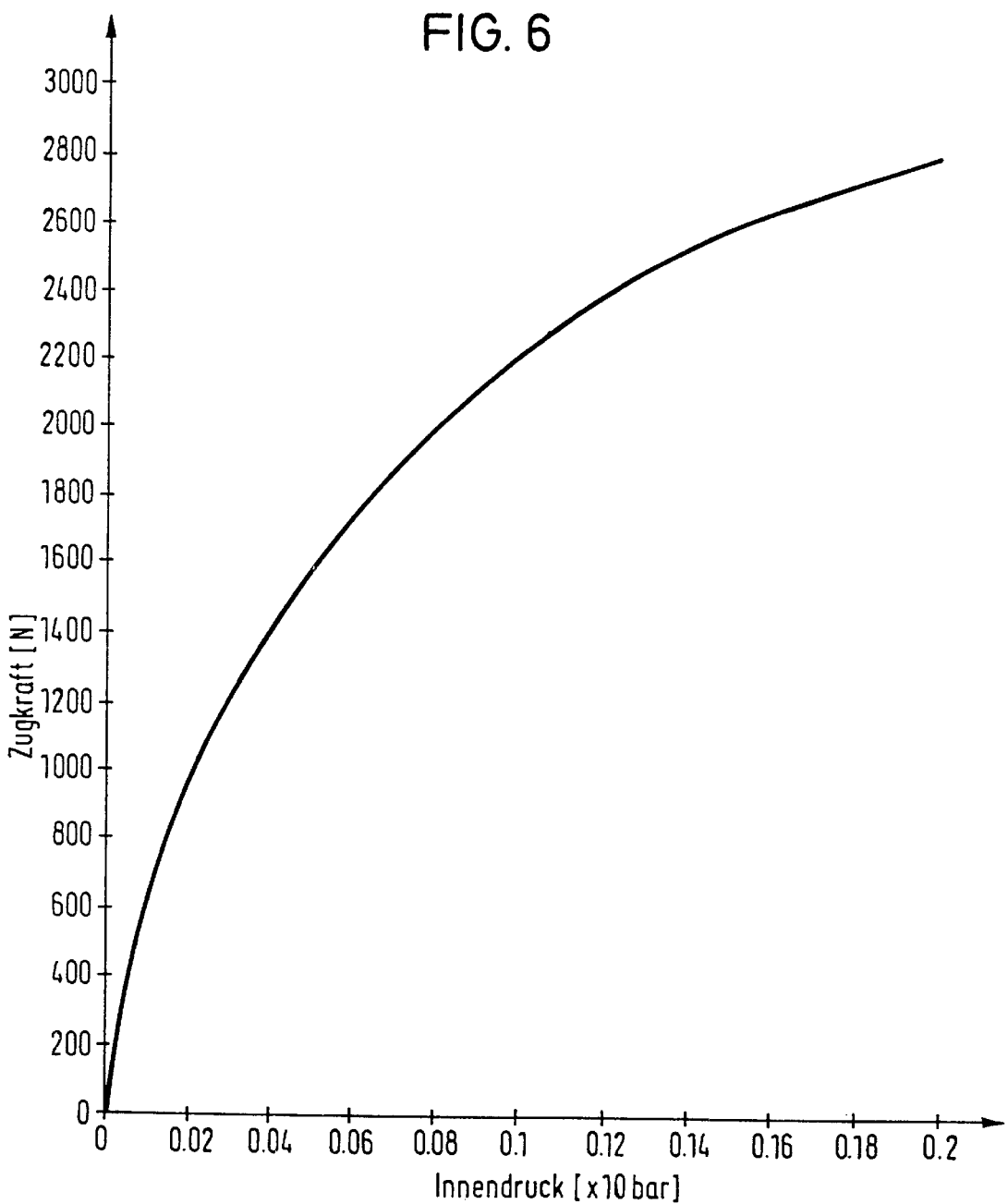
FIG. 6 shows a diagram which indicates the tensile force produced by the inflatable tightening means according to FIGS. 1 and 2 as a function of the internal pressure of the tightening means.
Figure 7:
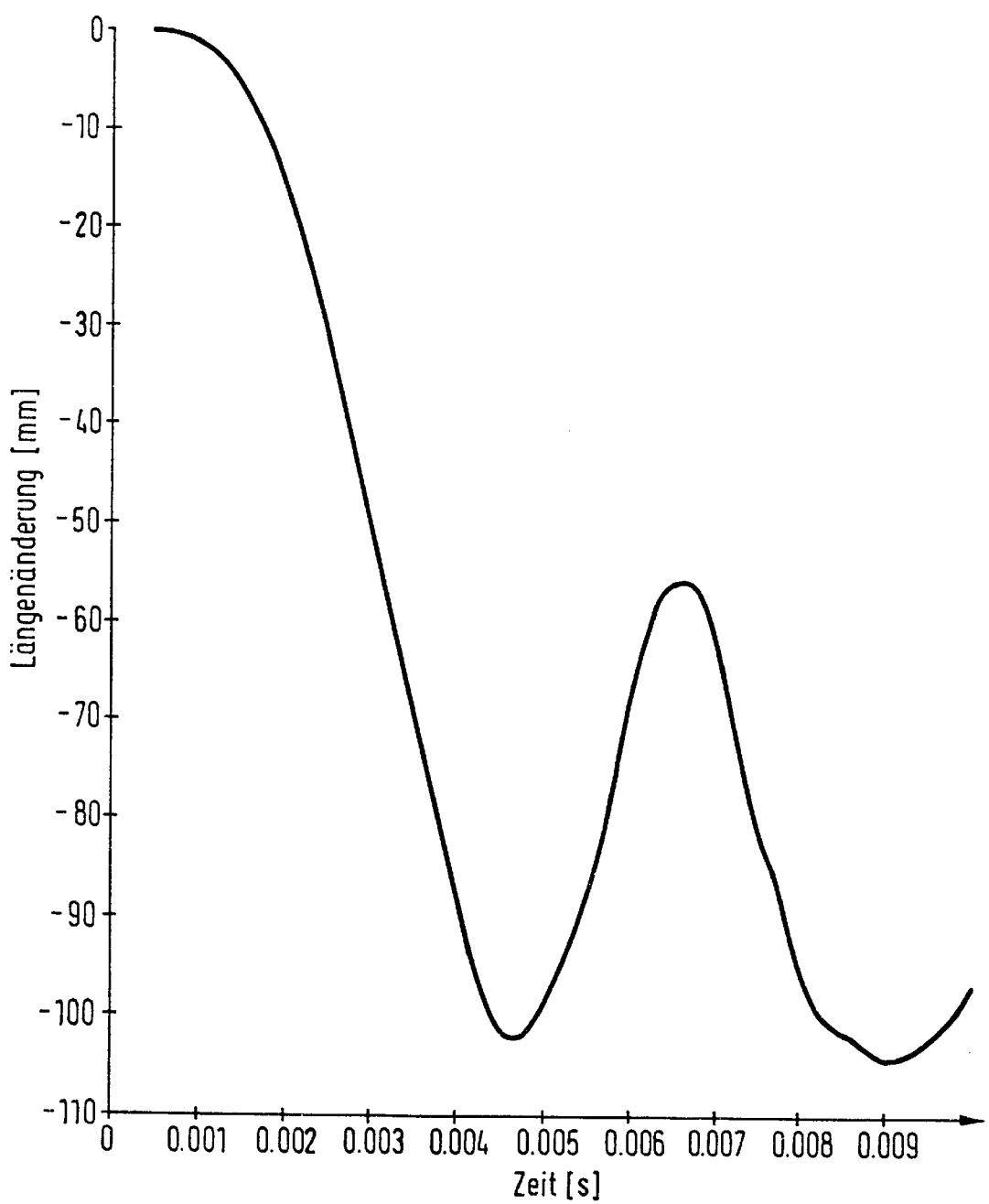
FIG. 7 shows a diagram which indicates the change in length of the inflatable tightening means of FIGS. 1 and 2 as a function of the duration of the inflation process.

To illustrate the tensile force by longitudinal contraction, in FIG. 6 the measured tensile force typically occurring on inflation of the tightening means 20 is illustrated as a function of the internal pressure inside the tightening means 20 and hence inside the gas bag 10. The shortening of the tightening means 20 takes place very quickly, typically between 5 to 10 ms, as can be seen from FIG. 7, which shows the change in length of the tightening means 20 as a function of the time which has elapsed from the beginning of the inflow of gas (chronological zero point in FIG. 7), wherein the tightening means 20, with a length of 400 mm and a diameter of 50 mm, shows a shortening or change in length of approximately 100 mm. The tightening means 20 is therefore suited to ensure, in the short time necessary for impact protection, the desired tensioning and keeping in position of the gas bag 10 with corresponding tensile force.

Figure 4:
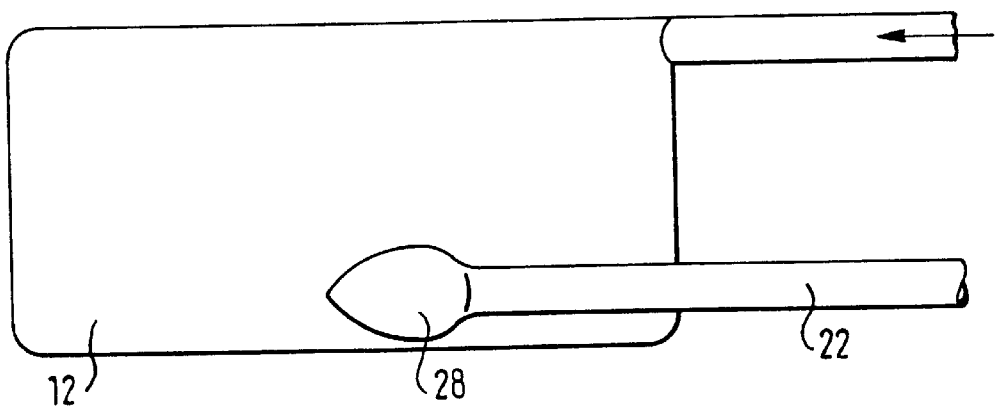
FIG. 4 shows a view which illustrates a further example for the arrangement of a tightening means on a gas bag, viewed in the direction of the arrow IV of FIG. 5.
Figure 5:
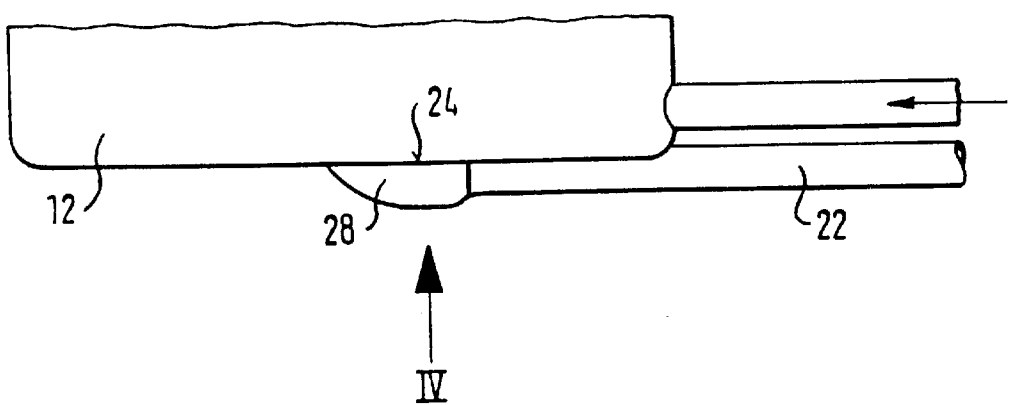
FIG. 5 shows the view of FIG. 4 in the direction of the arrow V of FIG. 4.

In FIGS. 3 to 5, different types of fastening of inflatable tightening means 20 on gas bags are illustrated diagrammatically. In FIG. 3, an inflatable tube-like tightening means 21 is fastened by a fastening portion 26 on a gas bag 11 in its marginal region. The fastening portion 26 is widened compared with the diameter of the tightening means 21 or is simply broader and has an approximately circular outline. In FIGS. 4 and 5 a further embodiment of an inflatable tightening means is shown. The tightening means 22 again has a fastening attachment 28 in end position, which is widened with respect to the diameter of the tightening means 22, in order to make possible a secure fastening to the gas bag 12 by weaving on or sewing on. The tightening means 22, however, in contrast to the tightening means 21 of FIG. 3, lies in sections against the gas bag 12, in order to make available for the gas bag 12 an improved, additional support on the tightening means 22.

What is claimed is:

1. A restraint device for the lateral restraining of occupants in a vehicle having an A- and a C-column, said restraint device comprising:

a cushion-shaped inflatable gas bag having several inflatable chambers in flow connection with each other, and a tensioning strap having two ends, one end being attached to said gas bag by attaching means, the other end being attached to said vehicle, said tensioning strap engaging said gas bag and pulling said gas bag into an intended position in a pulling direction upon inflation and holding said gas bag in the intended position, said gas bag extending from approximately the A-column to approximately the C-column of said vehicle, said tensioning strap having at least one inflatable tightening means, said inflatable tightening means having a deflated condition and an inflated condition, said inflatable tightening means having a length which shortens in said pulling direction upon inflation and exerting a tensile force on said gas bag, said inflatable tightening means being in flow connection with said gas bag.

2. The restraint device according to claim 1, wherein said attaching means is sewing or weaving.

3. The restraint device according to claim 1 wherein said inflatable tightening means is inflated by inflation gas flowing into said gas bag.

4. The restraint device according to claim 1, wherein said inflatable tightening means bulges in a direction perpendicular to said pulling direction upon inflation and shortens in length in said pulling direction.

5. The restraint device according to claim 1, wherein said inflatable tightening means is one of bag and tube-shaped.

6. The restraint device according to claim 5, wherein said inflatable tightening means is tube-shaped and is attached at one end to said gas bag and at the other end with a pretensioning arrangement.

7. The restraint device according to claim 1, wherein said inflatable tightening means has at one end a widened fastening portion, said inflatable tightening means being fastened to said gas bag at said fastening portion.

8. The restraint device according to claim 1, wherein several inflatable tightening means are provided, which engage different points of said gas bag.

9. The restraint device according to claim 1, wherein said gas bag is a side and head gas bag, which upon inflation, covers at least regions of at least one side window, and wherein front and rear ends of said gas bag are engaged by one tightening means each along a lower edge of said gas bag.

10. The restraint device according to claim 1, wherein said cushion-shaped inflatable gas bag has an inner side wall facing an interior of the vehicle and an outer side wall facing side windows of the vehicle, said tensioning strap being connected to said outer side wall of said gas bag.

11. The restraint device according to claim 10, wherein said outer side wall of said gas bag, upon inflation of said gas bag and said tensioning strap, abuts against said tensioning strap to support said gas bag.

12. The restraint device according to claim 1, wherein said tensioning strap is rotatably fastened at one end to a column of said vehicle.

13. The restraint device according to claim 1, wherein said inflatable tightening means is made of a fabric having a waving direction of 450° to a longitudinal extent of said tightening direction.

* * * * *

UNITED STATES PATENT AND TRADEMARK OFFICE
CERTIFICATE OF CORRECTION

PATENT NO.      : 6,290,253 B1                                    Page 1 of 1
DATED           : September 18, 2001
INVENTOR(S)     : Hans-Joachim Tietze et al.

It is certified that error appears in the above-identified patent and that said Letters Patent is hereby corrected as shown below:

<u>Title page,</u>
Item [22], PCT Filed: change "February 2, 1999" to -- February 11, 1999 --.

Signed and Sealed this

Ninth Day of April, 2002

Attest:

JAMES E. ROGAN
*Attesting Officer*  *Director of the United States Patent and Trademark Office*